US005898385A

United States Patent [19]

Makino

[11] Patent Number: 5,898,385

[45] Date of Patent: Apr. 27, 1999

[54] RADIO PAGING RECEIVER

[75] Inventor: Tetsuya Makino, Shizuoka, Japan

[73] Assignee: NEC Corporation, Tokyo, Japan

[21] Appl. No.: 08/904,814

[22] Filed: Aug. 1, 1997

[30] Foreign Application Priority Data

Aug. 2, 1996 [JP] Japan .................................... 8-205013

[51] Int. Cl.$^6$ ................................ G08B 5/22; H04Q 5/22

[52] U.S. Cl. ................................ 340/825.44; 340/825.52

[58] Field of Search ............................ 340/825.44, 311.1, 340/825.52, 825.47, 825.48; 341/67, 63, 65, 106, 95, 41; 370/472, 476; 345/194; 375/246, 253, 340

[56] References Cited

U.S. PATENT DOCUMENTS

| | | | |
|---|---|---|---|
| 4,759,022 | 7/1988 | Akerberg | 340/825.44 |
| 4,835,777 | 5/1989 | DeLuca et al. | 340/825.44 |
| 4,956,641 | 9/1990 | Matai et al. | 340/825.44 |
| 5,617,083 | 4/1997 | Schwendeman et al. | 340/825.44 |

*Primary Examiner*—Michael Horabik
*Assistant Examiner*—Jean B. Jeanglaude
*Attorney, Agent, or Firm*—Sughrue, Mion, Zinn, Macpeak & Seas, PLLC

[57] ABSTRACT

A radio paging receiver receives transmitted data containing a plurality of character code sequences, which can include sequences of different bit lengths and processes that, while segmenting character code sequences from the received data using a previously specified bit length for the segmentation; successively compares each segmented character code sequence with one or more predefined special codes conforming to the previously specified bit length; and when a segmented character code sequence does not match the one or more special codes, stores the segmented character code sequence as message data with a bit length corresponding to the previously specified bit length, but when a segmented character code sequence does match one of the one or more special codes, causes the bit length in which the received data are to be segmented to change to the bit length specified by the special code so that it can receive a series of messages comprising alphanumeric characters and Chinese or Japanese characters, which differ in the number of bits at which segmentation is required, without causing wasted air time.

8 Claims, 5 Drawing Sheets

| | | |
|---|---|---|
| received data : | 0100 0001 0100 0010 0100 0011 0100 0100 | segmentation set to 8 bit by initialization |
| message : | A B C D | |
| | 0100 0101 0100 0110 0100 0111 [0000 1111] | "0FH" |
| | E F G | |
| | 0011 0000 0010 0001 0011 0000 0010 0010 | 16 bit segmentation |
| | 亜 唖 | |
| | 0011 0000 0010 0011 0011 0000 0010 0100 | |
| | 娃 阿 | |
| | 0011 0000 0010 0101 0011 0000 0010 0110 | |
| | 哀 愛 | |
| | 0011 0000 0010 0111 [0000 0001 0010 0011] | "0123H" |
| | 挨 | |
| | 0000 0001 0010 0111 0100 0101 0110 0111 | 4 bit segmentation |
| | 0 1 2 3 4 5 6 7 | |
| | 1000 1001 | |
| | 8 9 | |

FIG.6

RADIO PAGING RECEIVER

BACKGROUND OF THE INVENTION

1. Field of the Invention

The present invention relates to radio paging receivers utilized in the paging of information containing a mixture of alphanumeric characters and characters, such as Chinese or Japanese characters, which require a larger number of bits for their representation (hereinafter referred to simply as "Chinese or Japanese characters").

2. Description of the Related Art

In recent years, advances in the functionality of radio paging receivers have included a move from receiving messages that comprise numerals only to receiving messages comprising alphanumeric characters and, in some regions, Chinese or Japanese characters. The representation of such characters requires the use of a larger number of bits, with the result that the number of bits needed to represent one character has increased. Moreover, because character-based messages have become possible, message size itself has increased.

At present, characters represented using a larger number of bits, such as Chinese or Japanese characters, are dealt with by using a segmentation scheme for alphanumeric characters in a special way. Namely, data sequences segmented by an alphanumeric segmentation scheme are combined in groups of two and assigned to a Chinese or Japanese character code table. It is also possible to have a mixture of alphanumeric characters and Chinese or Japanese characters in the same message.

The use of such a mixture of characters will be explained, taking as an example a system which represents Chinese or Japanese characters using 16 bits and alphanumeric characters using 8 bits. In the example system, the most significant bit of a Chinese or Japanese character code is a "1", while the most significant bit of an alphanumeric code is a "0", and the system makes use of this difference. The segmentation of the received data is based on 8 bits. The most significant bit of a data sequence segmented from the received data is ascertained. If this is a "0", the following data is also segmented on an 8 bit basis and its most significant bit ascertained. If this most significant bit is a "1", the processor considers the two groups of 8 bits as a combined group of 16 bits. Whether data represent an alphanumeric character or a Chinese or Japanese character can be ascertained by such a method, which therefore makes it possible to mix the two types of characters.

However, although a conventional radio paging receiver can receive a mixture of alphanumeric characters and Chinese or Japanese characters in the manner described above, various problems have been encountered with this method. Namely, it is affected by how the Chinese or Japanese characters are assigned to the Chinese or Japanese character code table. If the size of the code table is such that the Chinese or Japanese character codes use all 16 bits, or if the code table includes areas where the most significant bit is a "0", it will be impossible to represent those Chinese or Japanese characters of which the most significant bit is a "0", and it will be necessary either to move such data to another location, or to delete it. These code tables are standardized for use in a given region and cannot be altered simply for the sake of radio paging receivers. Nevertheless, hitherto there have been character codes which cannot be used unless amendments were made to the code table of the relevant region.

Meanwhile, a problem encountered in recent years has been that the trend towards sending larger messages has meant that the air time occupied by one message has increased. This has come about as follows. Namely, the increasing use of characters in messages and the increasing number of bits required per character has meant that although numerals, for example, can be represented using very few bits (4 bits), they have to be sent in a form that is matched to the number of bits needed to send a character, which means that a large number of wasted bits are sent. A large amount of the data in a message is in this unnecessary portion, and to this extent there is a wasteful use of air time.

The present invention overcomes problems of the sort described above. It is an object of this invention to provide a radio paging receiver capable of processing data which has been segmented by a plurality of previously specified segmentation schemes as a message which occupies little air time. This object is achieved by attaching, at the transmitting side, data segmentation information (information which indicates the number of bits into which subsequent data is to be segmented), changing over the message data segmentation scheme (the number of bits into which the data is segmented) in the course of the message, and making the radio paging receiver capable of recognizing the segmentation information.

SUMMARY OF THE INVENTION

To achieve the aforementioned object, a radio paging receiver according to the invention comprises receiving means for receiving transmitted data containing a plurality of character code sequences, which can include sequences of different bit lengths; and signal processing means which, while segmenting character code sequences from the received data using a previously specified bit length for the segmentation, successively compares each segmented character code sequence with one or more predefined special codes conforming to the previously specified bit length; and when a segmented character code sequence does not match the one or more special codes, stores the segmented character code sequence as message data with a bit length corresponding to the previously specified bit length, but when a segmented character code sequence does match one of the one or more special codes, causes the bit length in which the received data are to be segmented to change to the bit length specified by the special code.

It is preferable that the signal processing means is provided with a read/write memory for storing a segmented character code sequence as a message code when the segmented character code sequence does not match the predefined special codes.

It may be provided storage means in which the special codes are stored in advance. On this case, it may be arranged that the special codes can be set by an external device. As the storage means, it may be uses an electrically erasable memory.

It is preferable that the signal processing means recognizes special codes within received data that has been segmented by character segmentation at two or more different bit lengths, and when a special code is recognized, segments the received data that follows this special code on the basis of character segmentation at the bit length specified by the special code. On this case, it may be adapted that the radio paging receiver segments received data in units of 4 bits, 8 bits and 16 bits or in units of 4 bits, 7 bits and 14 bits.

BRIEF DESCRIPTION OF THE DRAWINGS

FIG. 6 serves to explain the relation between received data bits segmented according to this invention, and the characters of the message.

DETAILED DESCRIPTION OF THE PREFERRED EMBODIMENT

Figure 1:
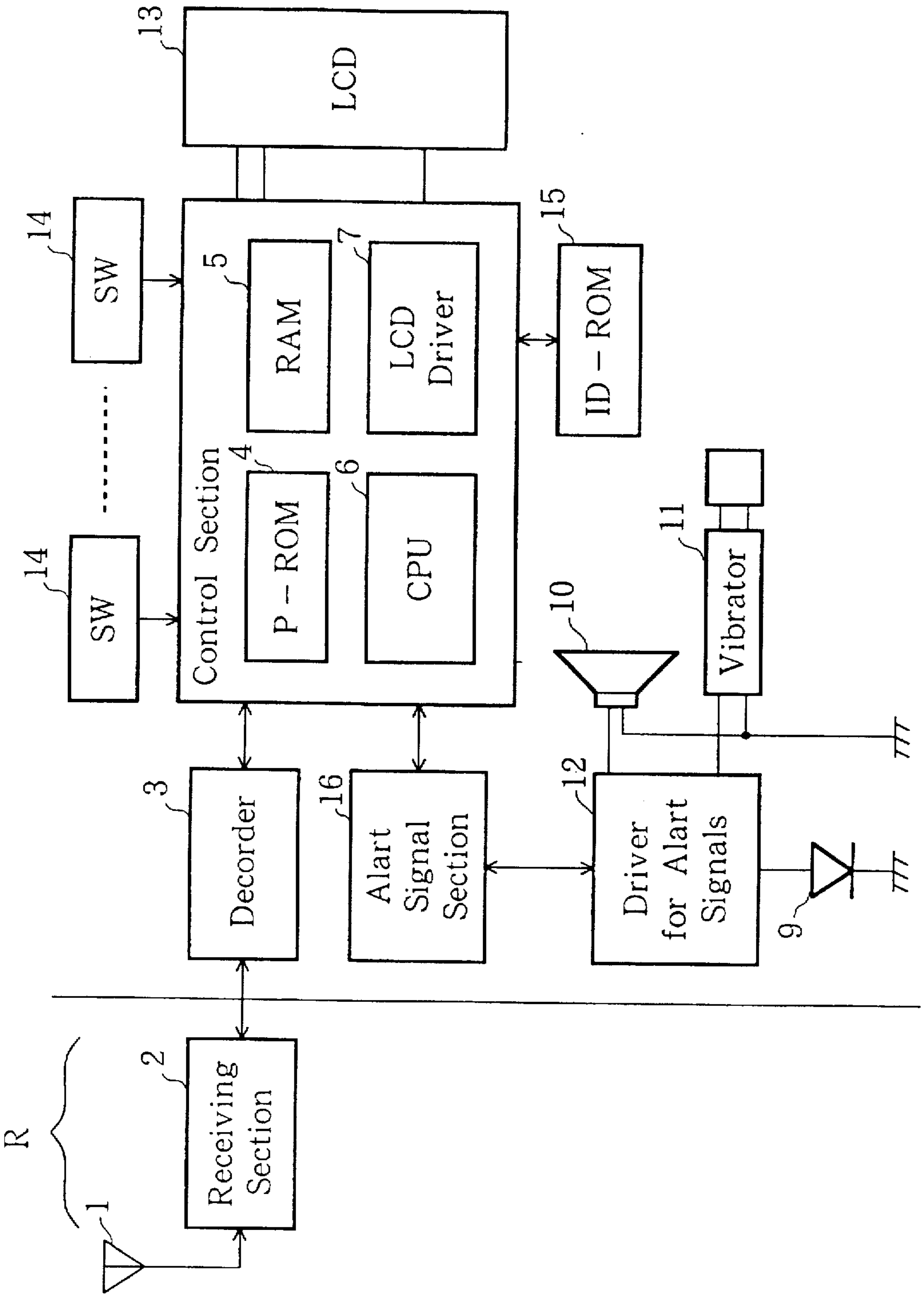
FIG. 1 is a block diagram showing a radio paging receiver according to an embodiment of the present invention.

An embodiment of this invention will now be explained with reference to the drawings. In FIG. 1, a radio paging receiver comprises a receiving antenna 1 and a receiving section 2 which receives, via antenna 1, a signal which has been modulated by a frequency shift keying scheme, and demodulates this signal. Antenna 1 and receiving section 2 together constitute receiving means R. The paging receiver also includes a decoder, programmable read only memory 4 (hereinafter termed P-ROM) for storing programs, character fonts and any selected optional functions for the radio paging receiver, a random access memory 5 (hereinafter termed RAM) serving as a read/write memory used for example to store received messages, a signal processing means 6 (hereinafter termed CPU) which performs the processing of the various types of signal, an LCD driver 7 for driving the liquid crystal display 13 (hereinafter termed LCD), a control section 8, a speaker 10 used as a means for giving notification that information has been received, a vibrator 11, a driver 12 for driving vibrator 11 and speaker 10, a switch 14 which applies an external interrupt to CPU 6, an ID-ROM 15 serving as nonvolatile memory for the initialization of the radio paging receiver, an alert signal section 16, and an earthing diode 9. A memory such as an EEPROM (an electrically erasable rewritable memory) can be used as the storage means for storing the special codes.

Figure 2:
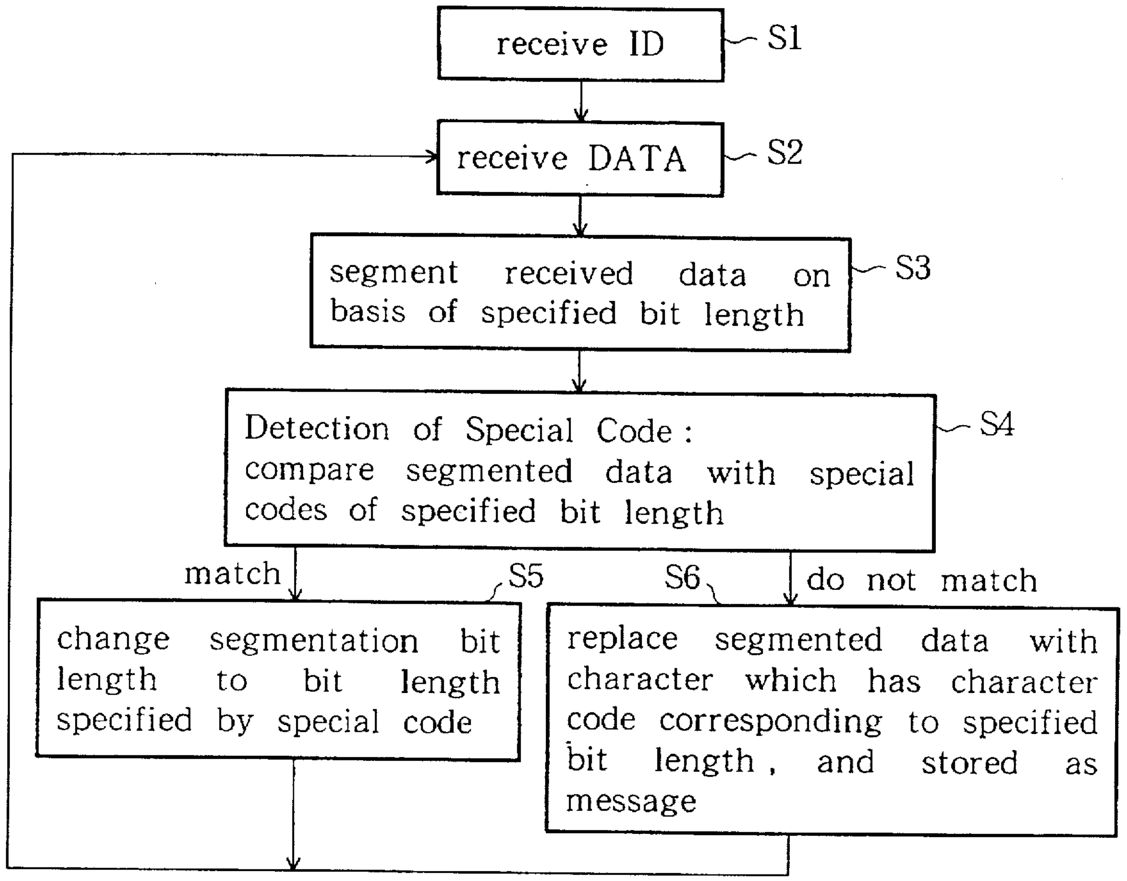
FIG. 2 is a flowchart showing the procedure for processing received data by means of the signal processing means of FIG. 1.
Figure 3:
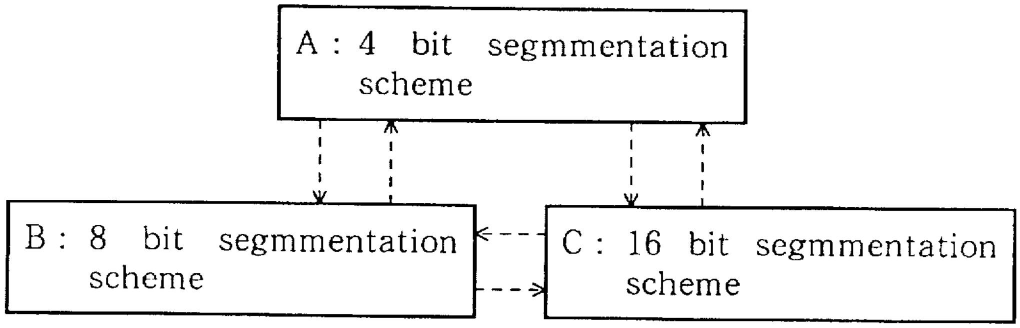
FIG. 3 serves to explain the bit segmentation schemes according to this invention.

The operation of this embodiment will now be explained. First of all, the procedure for altering the number of bits into which the received data is segmented will be explained using the flowchart shown in FIG. 2 and the transition diagram shown in FIG. 3. Once an identification signal (hereinafter termed ID) has been received via receiving means R (step S1), when any received data is transferred from decoder 3 (step S2), CPU 6 segments this received data on the basis of a previously specified bit length (step S3), and compares each block of data so segmented from the received data with one or more special predefined codes indicative of the number of bits into which received data should be segmented, in order to detect a special code (step S4). As soon as it has confirmed the presence of received data which matches a special code, CPU 6 changes the segmentation scheme applied to subsequent received data to the segmentation scheme specified by the special code (step S5).

If the segmented data does not match a special code, it is replaced with a character, this character having a character code corresponding in bit length to the segmented bit length. The character is then stored in RAM 5 as part of the message (step S6). Note that the data segmentation scheme used when data reception begins is determined in advance by the initialization, and that received data which contains no special codes is segmented in accordance with this initialization. The special codes are held in P-ROM 4 or ID-ROM 15.

The segmentation schemes used for the received data change as follows. For example, in FIG. 3, "A", "B" and "C" stand for the data units in which segmentation can be performed. In other words, "A" represents a 4-bit segmentation scheme, "B" represents an 8-bit scheme, and "C" represents a 16-bit scheme. Because all of the following changes are possible: 4-bit→8-bit, 4-bit→16-bit, 8-bit→4-bit, 8-bit→16-bit, 16-bit→4-bit, 16-bit→8-bit, changing from 4 bits to 16 bits can be carried out by receiving a special code just once, said special code specifying the new segmentation scheme. A 4-bit segmentation scheme can therefore be changed to a 16-bit scheme without first being changed to an 8-bit scheme.

Figure 4:
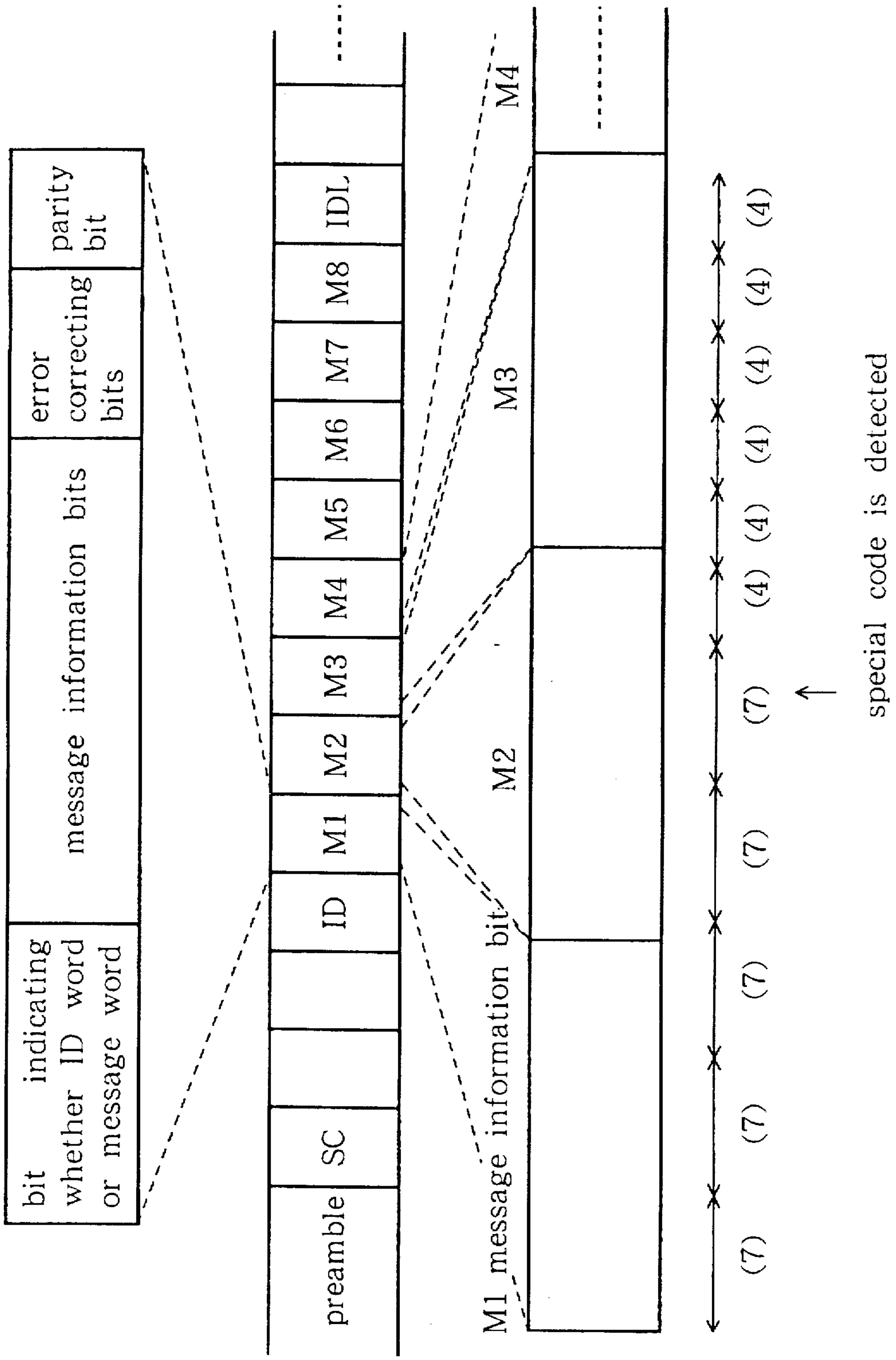
FIG. 4 shows the format of the received data in this invention.

FIG. 4 shows the signal format of the received data. This figure serves to explain both the signal format of the received data and how the data is transmitted in this format. The format employed is asynchronous, so first of all bit synchronization is obtained by means of a preamble signal (1010 . . . ), after which word (i.e., one lot of information) synchronization is obtained by means of a synchronization code (hereinafter termed SC). Thereafter, when the radio paging, receiver in question receives its own ID signal (this ID signal also being registered in the pager), it starts accepting Mx (message information) words. This continues until another ID (IDL) is received, or until an end of message code (EOT: end of transfer) is received. A message word in this signal format comprises 1 bit that shows whether the word is an ID word or a message word, the message information bits (20 bits), error correcting bits (10 bits), and 1 parity bit.

After establishing synchronization by means of the aforementioned preamble and SC, an ID search is performed. After the ID is received, the received data is accepted. After this received data has been accepted, it is confirmed by the error correcting bit, whereupon the message information bits are extracted and segmented on the basis of the specified bit length. For example, if the specified bit length is 7 bits, then as shown in the lowermost zone of FIG. 4, which indicates the extracted message information bits, the bits are successively segmented in 7-bit groups starting from the front and are stored as 7-bit message data. When a special code has been segmented on the basis of the 7-bit segmentation, subsequent segmentation is changed to the segmentation specified by the special code. If it is changed for example to 4-bit segmentation, subsequent data bits are segmented into groups of four bits and are stored as 4-bit message data. In this way, message data is stored on the basis of specified segmentations until the end of the message words, and whenever a special code is present, the change to the specified segmentation is repeated. In order to give an explanation that concentrates on just the message information bits, we will now explain how just the message information bits are extracted and connected together. This invention relates only to the message information bits sent as a message, and it can easily support other signal formats.

A receiver capable of receiving 4-bit, 8-bit or 16-bit data will be assumed, and it will be supposed that the segmentation scheme initially employed on received data (the basic scheme) is 8-bit segmentation. In addition, the special codes are specified as following table;

| Current Segmentation Scheme | Special Code for Changing the Scheme | Changed Segmentation Scheme |
|---|---|---|
| 8 bit | 0FH | 16 bit |
| 8 bit | 10H | 4 bit |
| 16 bit | 1234H | 8 bit |
| 16 bit | 0123H | 4 bit |
| 4 bit | AH | 16 bit |
| 4 bit | BH | 8 bit |

In the case of the special codes indicating a change from 4 bits, there are various ways to reduce the chance of an erroneous change. For example, the change can be made when the designated special code has been received twice in succession. Alternatively, two different special codes can be set and the change made when these two sequences have been received in succession.

Figure 5:
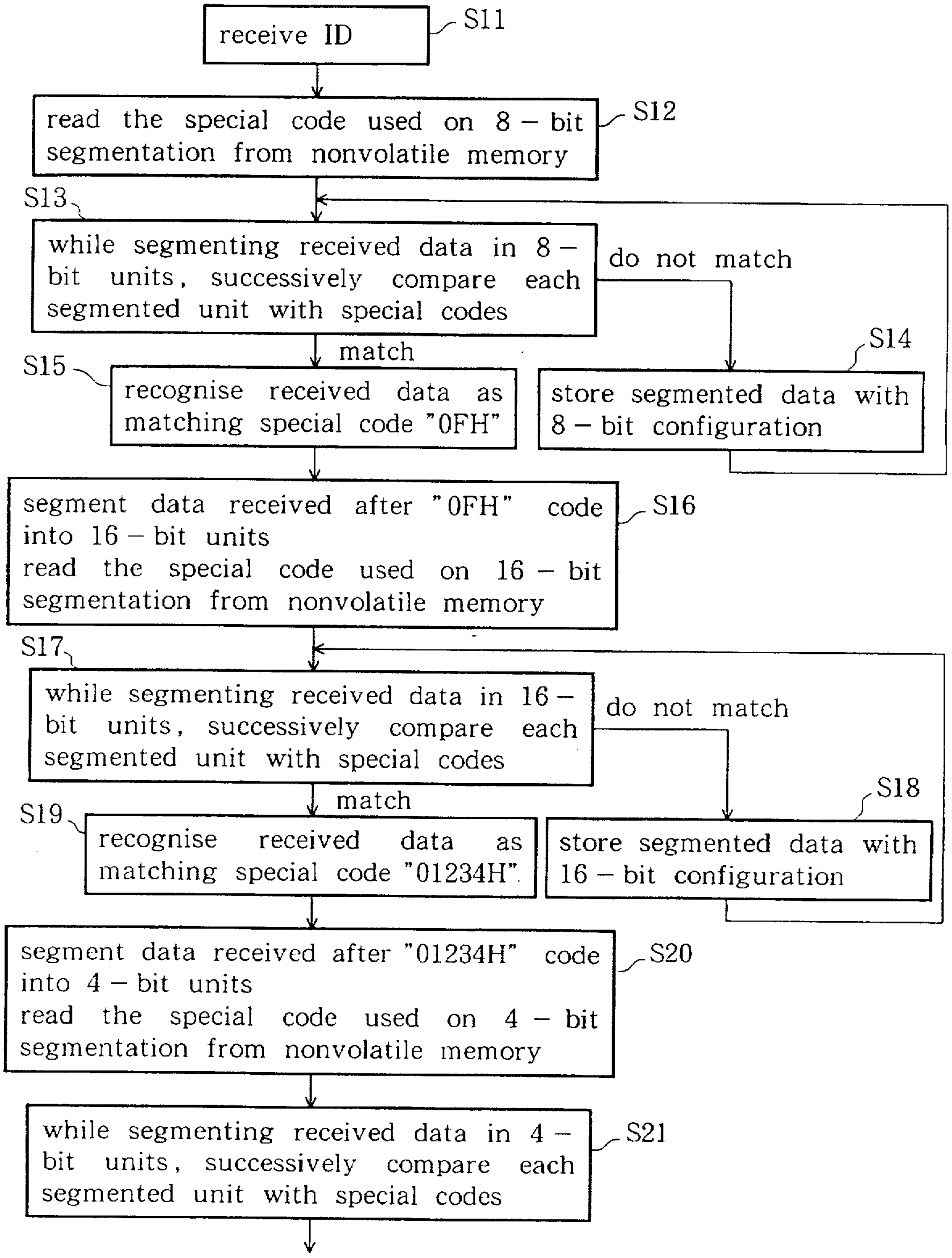
FIG. 5 is a flowchart showing in greater detail the bit segmentation procedure for received data according to this invention.

The procedure for changing the segmentation scheme will now be explained in greater detail with reference to the flowchart of FIG. 5. First of all, in the previously described signal format, after receiving the ID (step S11), special codes "0FH" and "10H", used to change from 8-bit segmentation, this being the initial value of the segmentation, are read from P-ROM 4 or ID-ROM 15 (step S12). Next, the received data segmented in 8-bit units is successively compared with the special codes that have been read in this way (step S13). Whenever an 8-bit segment of received data does not match the special codes, the part of the message comprising those 8 bits is stored in RAM 5 as a character (step S14). On the other hand, if the received data matches a special code, CPU 6 recognizes the received data as matching that special code, for example "0FH" (step S15), and segments subsequent received data in 16-bit units. CPU 6 then reads the special codes "1234H" and "0123H", used to change from 16-bit segmentation, from P-ROM 4 or ID-ROM 15 (step S16).

Next, the received data segmented in 16-bit units subsequent to received data "0FH" is successively compared with these special codes (step S17). In similar manner to the processing described above, if the special codes and the received data do not match, a portion of the message comprising 16 bits is stored in RAM 5 as a character (step S18). When CPU 6 recognizes received data as matching a special code, for example "0123H" (step S19), it segments subsequent received data in 4-bit units and reads the special codes "AH" and "BH" from P-ROM 4 or ID-ROM 15 (step S20). Next, while segmenting the received data into 4-bit units, CPU 6 compares it with these special codes, and continues processing in the same manner as described above (step S21).

The correspondence between message data and received data will now be explained with reference to FIG. 6. Received data is first of all segmented into 8-bit units, this being the initial value of the segmentation, and each 8-bit data block is replaced by its equivalent character "A", "B", "C", "D", "E", "F" and "G", and these are stored in RAM 5 as message data. In the present example, where the special code specifying a change in segmentation scheme is "0FH", the occurrence of "0FH" in the received data results in subsequent received data being segmented in 16-bit units, whereupon the Chinese characters shown in FIG. 6 (hereinafter represented by "!", "£", "$", "%", "&", "@" and "#") are stored in RAM 5 as message data. If the next special code is "0123H", received data subsequent to this is segmented into 4-bit units, and "0", "1", "2", "3", "4", "5", "6", "7", "8" and "9" are stored as message data. The result of this processing is that the message "A B C D E F G !£$%&@# 0 1 2 3 4 5 6 7 8 9" is obtained for the ID in question.

According to the invention, there is provided receiving means for receiving transmitted data containing a plurality of character code sequences, which can include sequences of different bit lengths; and signal processing means which, while segmenting character code sequences based on a previously specified bit length, successively compares each segmented character code sequence with one or more predefined special codes indicative of the number of bits into which the received data should be segmented, and when a segmented character code sequence does not match the one or more special codes, stores the segmented character code sequence as message data with a bit length corresponding to the previously specified bit length, but when a segmented character code sequence does match one of the one or more special codes, causes the bit length in which the received data are to be segmented to change to the bit length specified by the special code. The effect of this arrangement is that a series of communicated messages comprising alphanumeric characters and Chinese or Japanese characters, which require different segmentation schemes, can be transmitted and received without causing wasted air time.

The signal processing means may be provided with a read/write memory for storing a segmented character code sequence as a message code when the segmented character code sequence does not match the predefined special codes. The effect of this arrangement is that a communicated message is stored and displayed on the basis of segmentation using the last specified number of bits, until another special code is detected.

There may be provided storage means for storing the special codes in advance. The effect of this arrangement is that bit segmentation of received data can be performed reliably using a segmentation scheme conforming to special codes read from this storage means.

The special codes can be set by an external device. The effect of this arrangement is that data segmented by a specified segmentation scheme can be accepted as a message by recognition, at the receiving side, of the special code that has been set.

An electrically erasable memory may be used as the storage means. The effect of this arrangement is that the special codes can be rewritten a plurality of times.

The signal processing means may be arranged to recognize special codes within received data that has been segmented by character segmentation at two or more different bit lengths, and when a special code is recognized, segments the received data that follows this special code on the basis of character segmentation at the bit length specified by the special code. The effect of this arrangement is that the segmentation scheme applied to the received bits can be changed without disordering a commonly used code table. A further effect is that because the segmentation scheme can be freely changed within one message, data configurations that contain wasted data are eliminated and air time per message can be reduced.

Received data may be segmented respectively in units of 4 bits, 8 bits and 16 bits, or in units of 4 bits, 7 bits and 14 bits. The result of this arrangement is that transmission and receiving of data can be performed efficiently by using the minimum number of bits for messages comprising a series of characters including both alphanumeric and Chinese or Japanese characters.

I claim:

1. A radio paging receiver comprising:

receiving means for receiving transmitted data containing a plurality of character code sequences, which can include sequences of different bit lengths; and signal processing means which, while segmenting character code sequences from the received data using a previously specified bit length for the segmentation, successively compares each segmented character code sequence with one or more predefined special codes conforming to the previously specified bit length; and when a segmented character code sequence does not match the one or more special codes, stores the segmented character code sequence as message data with a bit length corresponding to the previously specified bit length, but when a segmented character code sequence does match one of the one or more special codes, causes the bit length in which the received data are to be segmented to change to the bit length specified by the special code.

2. A radio paging receiver according to claim 1, wherein the signal processing means is provided with a read/write memory for storing a segmented character code sequence as a message code when the segmented character code sequence does not match the predefined special codes.

3. A radio paging receiver according to claim 1, which has storage means in which the special codes are stored in advance.

4. A radio paging receiver according to claim 3, wherein the special codes can be set by an external device.

5. A radio paging receiver according to claim 3, wherein the storage means is an electrically erasable memory.

6. A radio paging receiver according to claim 1, wherein the signal processing means recognizes special codes within received data that has been segmented by character segmentation at two or more different bit lengths, and when a special code is recognized, segments the received data that follows this special code on the basis of character segmentation at the bit length specified by the special code.

7. A radio paging receiver according to claim 6, which segments received data in units of 4 bits, 8 bits, and 16 bits.

8. A radio paging receiver according to claim 6, which segments received data in units of 4 bits, 7 bits, and 14 bits.

* * * * *